(12) United States Patent
Wellington et al.

(10) Patent No.: US 7,287,867 B2
(45) Date of Patent: Oct. 30, 2007

(54) POWER TELESCOPING VEHICLE MIRROR ASSEMBLY

(75) Inventors: Jason Kingsley Wellington, Richmond (AU); James Nicholas Dickson, Glenelg North (AU)

(73) Assignee: Schefenacker Vision Systems Australia Pty Ltd. (AU)

( * ) Notice: Subject to any disclaimer, the term of this patent is extended or adjusted under 35 U.S.C. 154(b) by 56 days.

(21) Appl. No.: 10/494,096

(22) PCT Filed: Oct. 30, 2002

(86) PCT No.: PCT/AU02/01464

§ 371 (c)(1),
(2), (4) Date: Apr. 30, 2004

(87) PCT Pub. No.: WO03/037681

PCT Pub. Date: May 8, 2003

(65) Prior Publication Data

US 2004/0246608 A1 Dec. 9, 2004

(30) Foreign Application Priority Data

Oct. 30, 2001 (AU) .................................... PR8528
Oct. 30, 2001 (AU) .................................... PR8529

(51) Int. Cl.
*G02B 5/08* (2006.01)
*G02B 5/10* (2006.01)
*G02B 7/182* (2006.01)
*B60R 1/06* (2006.01)

(52) U.S. Cl. ...................... 359/841; 359/843; 359/865; 359/877

(58) Field of Classification Search ................ 359/841, 359/843, 864, 865, 872, 881, 877
See application file for complete search history.

(56) References Cited

U.S. PATENT DOCUMENTS

| 3,389,952 | A | * | 6/1968 | Tobin, Jr. | .................... 359/864 |
| 4,331,382 | A | * | 5/1982 | Graff | .......................... 359/868 |
| 4,544,871 | A |   | 10/1985 | Suzuki | |
| 4,558,930 | A | * | 12/1985 | Deedreek | .................... 359/841 |
| 4,727,302 | A | * | 2/1988 | Mizuta et al. | .............. 318/567 |
| 4,936,671 | A | * | 6/1990 | Kaspar | ....................... 359/877 |
| 4,955,703 | A |   | 9/1990 | Janowicz | |

(Continued)

FOREIGN PATENT DOCUMENTS

WO          WO 00/26700          5/2000

*Primary Examiner*—Ricky D. Shafer

(57) ABSTRACT

A power telescoping vehicle mirror assembly (10) comprising a bracket (12) mountable to a vehicle, a mirror head (15), telescopically mounted to the bracket (12), a mirror (16) mounted to the head (15), a power telescope motor mechanism (30) for telescopically moving the head (15) with respect to the bracket (12), a position controller for controlling the extent to which the mirror head (15) extends with respect to the vehicle, a switch operable by a driver of the vehicle, the switch providing a signal to the position controller, and an input means for providing the position controller with a set point, wherein upon actuation of the switch, the head (15) telescopically moves with respect to the bracket (12) from a retracted position to a partially extended position determined by the set point. In an other embodiment, a spotter mirror, and a spotter mirror motor mechanism for adjusting the orientation of the spotter mirror with respect to the mirror head is also disclosed.

9 Claims, 4 Drawing Sheets

U.S. PATENT DOCUMENTS

| | | | |
|---|---|---|---|
| 5,007,724 A * | 4/1991 | Hou | 359/841 |
| 5,115,352 A * | 5/1992 | do Espirito Santo | 359/855 |
| 5,624,176 A * | 4/1997 | O'Farrell et al. | 362/494 |
| 5,687,035 A | 11/1997 | Lang | |
| 5,796,176 A * | 8/1998 | Kramer et al. | 307/10.1 |
| 5,835,291 A * | 11/1998 | Takayama | 359/843 |
| 5,886,838 A * | 3/1999 | Kuramoto | 359/841 |
| 5,889,627 A * | 3/1999 | Englander et al. | 359/864 |
| 5,990,649 A * | 11/1999 | Nagao et al. | 318/568.1 |
| 6,183,096 B1 * | 2/2001 | Galicia | 359/871 |
| 6,213,609 B1 | 4/2001 | Foote et al. | |
| 6,580,992 B2 * | 6/2003 | Whitten et al. | 701/49 |
| 6,755,543 B1 * | 6/2004 | Foote et al. | 359/877 |
| 6,848,816 B2 * | 2/2005 | Gilbert et al. | 362/494 |
| 6,916,100 B2 * | 7/2005 | Pavao | 359/841 |

* cited by examiner

POWER TELESCOPING VEHICLE MIRROR ASSEMBLY

This application is a National Stage of International Application No. PCT/AU02/01464, filed Oct. 30, 2002, which claims the priority of Australian Patent Application Serial No. PR 8528, filed Oct. 30, 2001, and Australian Patent Application Serial No. PR 8529, filed Oct. 30, 2001.

FIELD

The invention relates to vehicle external mirror assemblies ("wing" mirror assemblies) and in particular to mirror assemblies having motor mechanisms for adjustment.

BACKGROUND

It is desirable to be able to move a mirror head, which holds a mirror, with respect to a mounting bracket on a motor vehicle away from or back towards the mounting bracket. This enables the mirror head to be positioned either close to the side of the motor vehicle, or to be extended away from the motor vehicle. In its extended position, an improved field of view behind the vehicle can be provided, particularly where a rear view may be obstructed by a load on the vehicle or a trailer behind the vehicle.

Powered telescoping mirrors have been developed to allow the mirror head position to be extended or retracted remotely as desired without the need to exit the vehicle (for manual mirror adjustment).

Power telescoping mirrors are provided both as original equipment on vehicles (OEM) and as after market accessories. In either case, the optimum extended position for the mirror head will vary according to a number of factors. For instance, very wide vehicles will not require as much extendability as less wide vehicles. The requirements of particular vehicle owners will also vary depending upon what loads and or trailers they carry or tow.

Power telescoping and conventional fixed width vehicle external mirrors are often fitted with a "spotter" mirror in addition to the main mirror. The spotter mirror generally has a convex surface and provides a broader view of the rear and side of the vehicle. The spotter mirror is particularly useful for covering the so called "blind spot" which is a region at the side of the vehicle which is not visible through the normal plain mirror and is not visible to the driver casting a brief glance to the side of the vehicle. These spotter mirrors are usually not readily adjustable requiring a vehicle occupant to physically manipulate the mirror angle.

Power telescoping mirrors are currently known where the vehicle operator must manually control the telescoping of the mirror until it reaches the desired degree of extension with respect to the vehicle side.

A further problem with existing power telescoping mirrors is that as the mirror head is extended away from the vehicle side, the reflected image presented to the driver changes both in size and in general direction. As a result, the vehicle operator often needs to adjust the angular position of the mirror with respect to the mirror head when the mirror has been shifted from its fully retracted position to a partially or fully extended position to obtain an optimum field of view.

It is an object of the invention to provide a vehicle external mirror that overcomes at least some of the above stated problems.

SUMMARY OF THE INVENTION

According to a first aspect of the invention there is provided a power telescoping vehicle mirror assembly comprising:
 a bracket mountable to a vehicle;
 a mirror head telescopically mounted to the bracket;
 a mirror mounted to the head;
 a power telescope motor mechanism for telescopically moving the head with respect to the bracket;
 a position controller for controlling the extent to which the mirror head extends with respect to the vehicle;
 a switch operable by a driver of the vehicle, the switch providing a signal to the position controller; and
 an input means for providing the position controller with a set point,
 wherein upon actuation of the switch, the head telescopically moves with respect to the bracket from a retracted position to a partially extended position determined by the set point.

Preferably the assembly further comprises a position sensor for sensing the telescopic position of the mirror head with respect to the mirror bracket.

A compensating controller may also be provided, the compensating controller controlling the angular position of the mirror with respect to the head in response to the telescopic position of the head as sensed by the position sensor.

According to a second aspect of the invention there is provided a power telescoping vehicle mirror assembly comprising:
 a bracket mountable to a vehicle;
 a head telescopically mounted to the bracket;
 a mirror pivotally mounted to the head;
 a mirror adjusting motor mechanism for adjusting the angular position of the mirror with respect to the head;
 a power telescope motor mechanism for telescopically moving the head with respect to the bracket between a retracted position and an extended position;
 a switch operable by a driver of the vehicle, the switch providing a signal to actuate the power telescope motor mechanism;
 a position sensor for sensing the telescopic position of the mirror head with respect to the mirror bracket; and
 a compensating controller, the compensating controller controlling the angular position of the mirror with respect to the head in response to the telescopic position of the head as sensed by the position sensor.

Preferably the angle between the normal axis of the mirror and the longitudinal axis of the vehicle increases as the mirror head extends away from the mirror bracket.

Preferably the increase is such that a continually acceptable field of view is presented to the driver without the need for manual adjustment of the angular position of the mirror with respect to the head.

According to a third aspect of the invention there is provided a vehicle external mirror assembly comprising:
 a bracket mountable to a vehicle;
 a mirror head mounted to the bracket;
 a main mirror mounted to the head; and
 a spotter mirror mounted to the head, the spotter mirror having a wider field of view than the main mirror; and
 a spotter mirror motor mechanism for adjusting the orientation of the spotter mirror with respect to the head.

Preferably the assembly further comprises control apparatus wherein, if the vehicle is placed in a reversed gear, the orientation of the spotter mirror is automatically adjusted to assume an orientation that provides a different field of view for reversing.

DETAILED DESCRIPTION OF PREFERRED EMBODIMENTS OF THE INVENTION

Preferred embodiments of the invention are illustrated in the accompanying representations in which.

Figure 1:
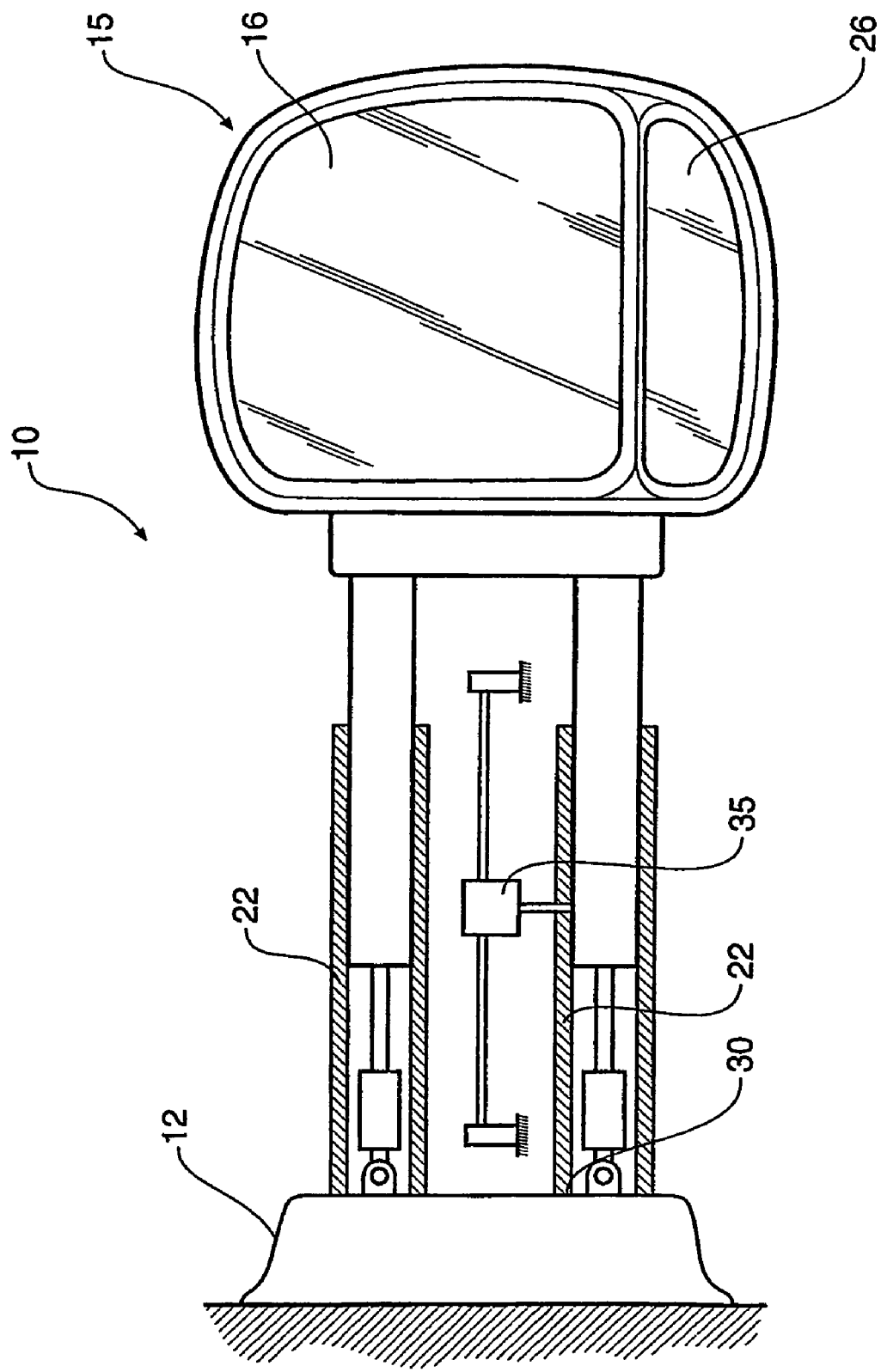
FIG. 1 is a schematic view of a power telescoping vehicle mirror assembly according to the invention.

Referring to FIG. 1, a power telescoping vehicle mirror assembly 10 is shown. The assembly includes a bracket 12 mountable to a vehicle, a head 15 telescopically mounted to the bracket via arms 22, and mirror 16 mounted to the head. A power telescope motor mechanism 30 is provided for telescopically moving the head 15 with respect to the bracket 12. A position controller (shown schematically in FIG. 2) 40 is provided for controlling the extent to which the mirror head 15 extends with respect to the vehicle. A switch 18 (again shown in FIG. 2) operable by a driver of the vehicle provides a signal to the position controller 40, where upon actuation of the switch 18, the head 15 telescopically move with respect to the bracket 12 from a retracted position to a partially extended position determined by a set point.

The set point may either be factory pre-set or maybe set by the vehicle user in the field.

Figure 2:
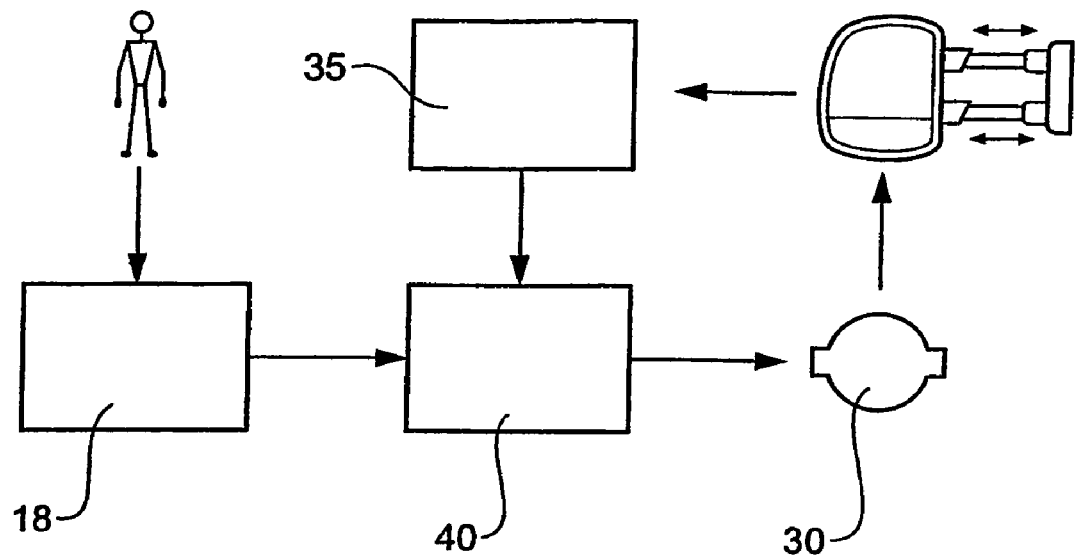
FIG. 2 is a control diagram schematic for the mirror assembly of FIG. 1.

Referring to FIG. 2, the control sequence is shown. The driver actuates switch 18 which then sends a signal to the position controller 40 provides a signal to the power telescope mechanism 30 which causes the mirror head 15 to extend or retract to the set position. The head position is sensed by position sensor 35 and the position sensor 35 provides feedback to the position controller 40 in a closed loop system.

Figure 3:
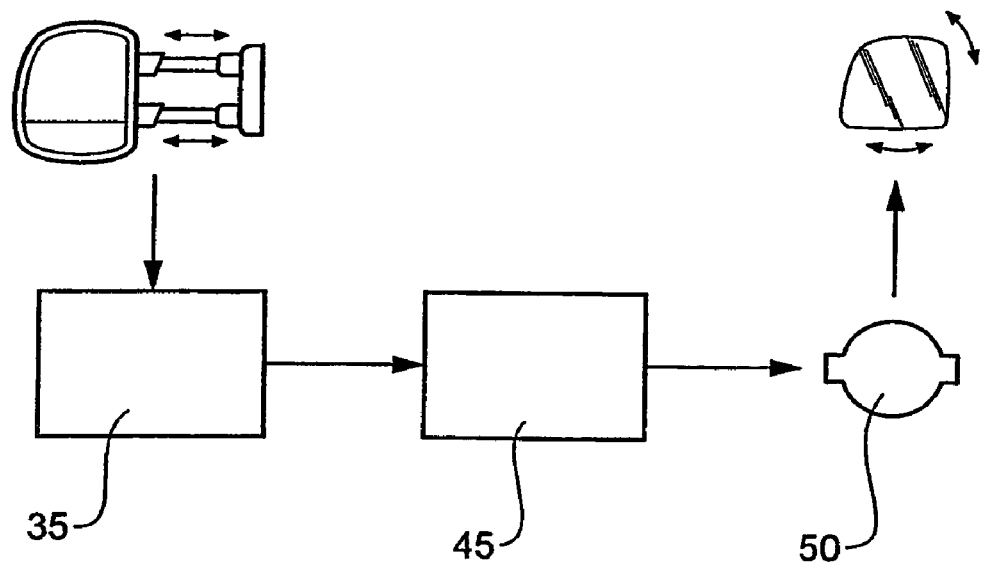
FIG. 3 is a control diagram schematic for a power telescoping vehicle mirror assembly according the a second embodiment of the invention.
Figure 4:
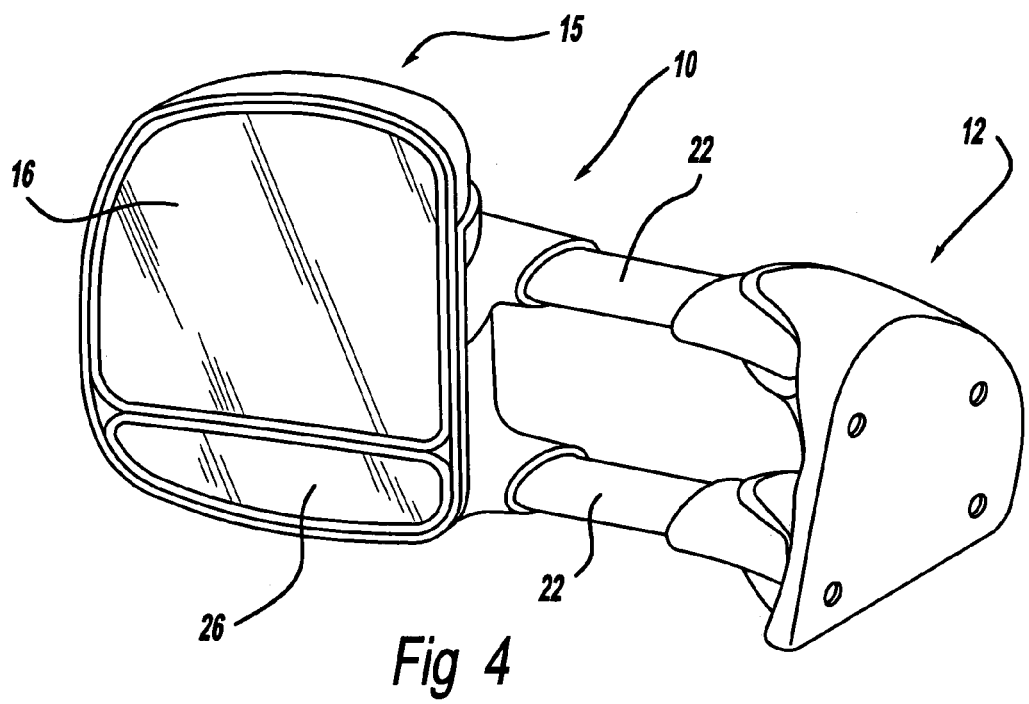
FIGS. 4 and 5 show a power telescoping vehicle mirror assembly according to a second embodiment of the invention in a retracted and an extended position respectively.
Figure 5:
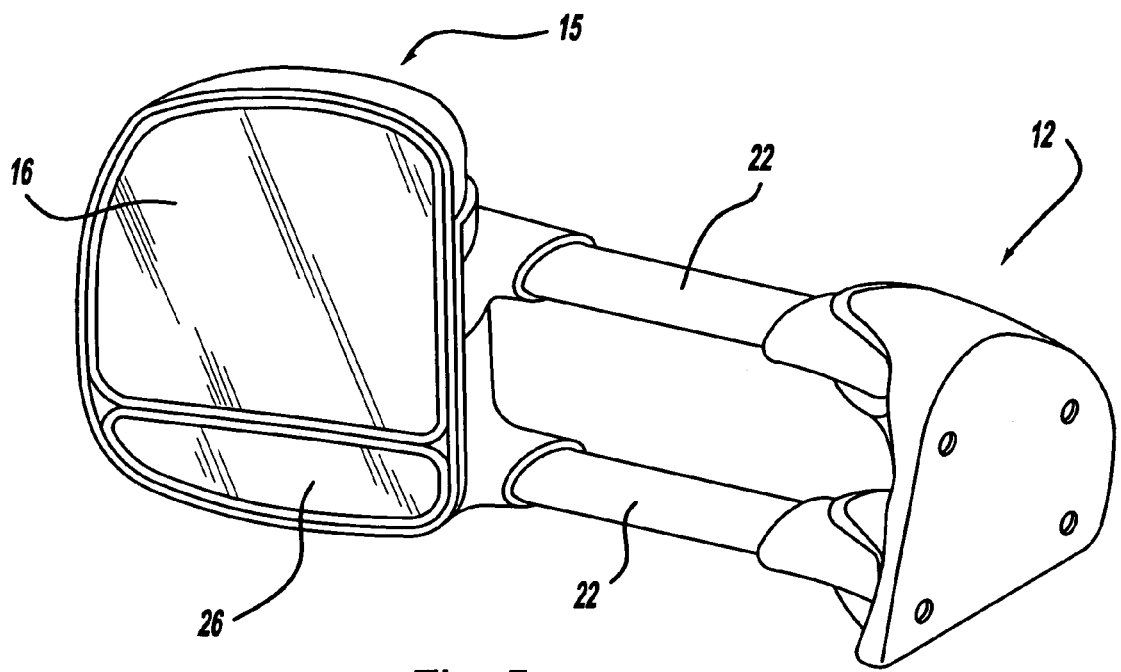

A second embodiment of the invention is shown in FIGS. 3, 4 and 5. With this embodiment of the invention the power telescoping vehicle mirror assembly further comprises a mirror the angular position of which is adjustable by a motor mechanism in response to a compensating controller 45. The compensating controller 45 controls the angular position of the mirror 16 with respect to the head 15 in response to the telescopic position of the head 15 with respect to the bracket 12.

The angular position of the mirror is controlled by the compensating mirror such that the angle between the normal axis of the mirror and the longitudinal axis of the vehicle increases as the mirror head extends from the mirror bracket so as to provide a continually acceptable field of view to the driver without the need for manual adjustment of the angular position of the mirror with respect to the head.

The compensating controller 45 is shown in a separate functional element in FIG. 3. In practice a single device may be used to provide the function of the position controller 40 and the compensating controller 45.

In order to manually set the compensation, the user records the angular position of the mirror 16 with respect to the head 15 in a retracted and an extended position. Recording can be achieved by various means, for instance simply by pressing a "record" button or buttons. Once set, the controller 45 then interpolates between the two user defined positions to determine the angular position of the mirror 16 to achieve optimum field of view for that particular driver at all mirror head positions.

Optionally a memory may be provided so that the set points for a number of different drivers can be stored.

With either of the above described embodiments of the invention a dual arm extension mechanism or a single or mono-arm extension mechanism may be used. Again with either embodiment of the invention as described above, the mirror 16 may be fixed with respect the mirror head 15 and the entire head 15 may be angularly movable with respect to the arms 22.

Again with either embodiment of the invention as described above, the glass 16 may be fixed with respect the mirror head 15 and the entire head 15 may be angularly movable with respect to the arms 22.

Numerous control systems can be used to achieve the functions described above. For instance, look up tables may be utilised, interpolation may be used or other algorithms may be used to determine the relationship between various inputs and outputs.

Figure 6:
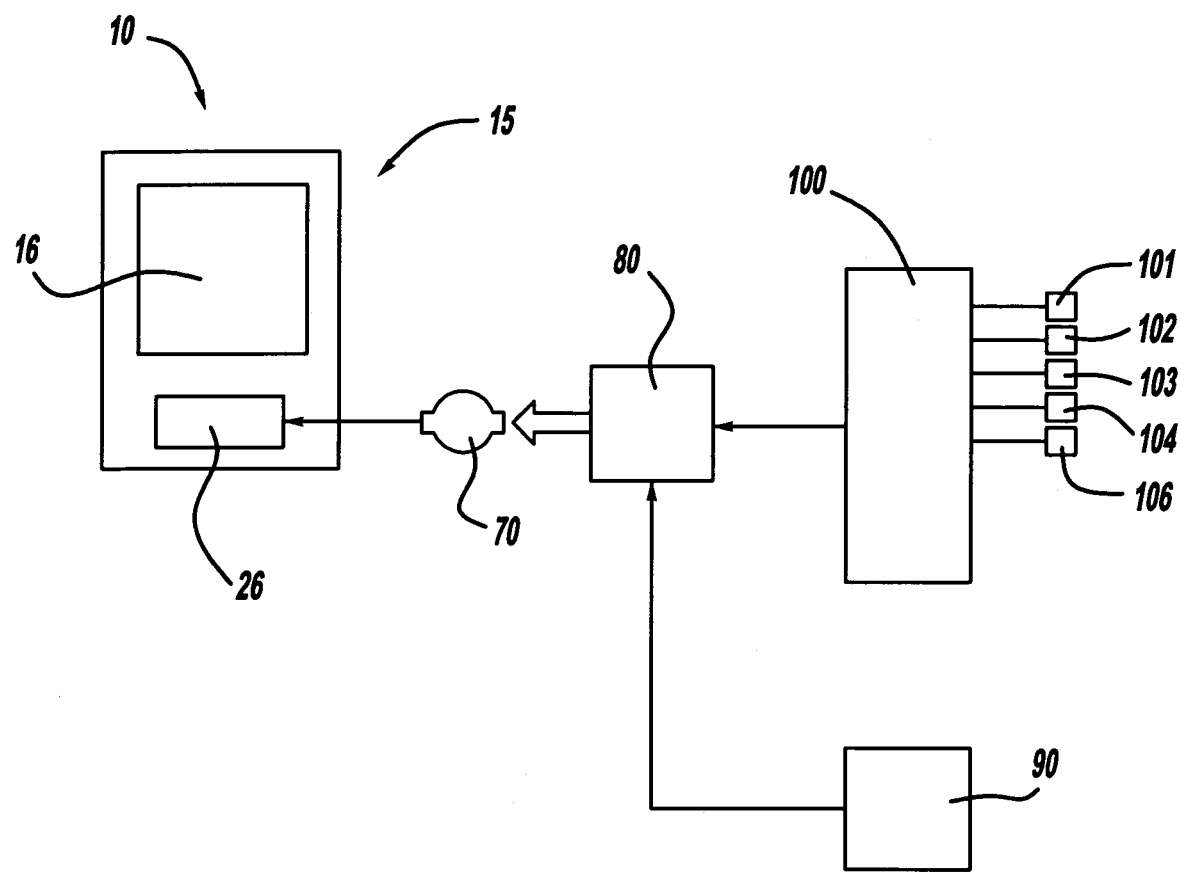
FIG. 6 shows a system block diagram for a mirror assembly according to a third embodiment of the invention.

Referring to FIG. 6, to be read in conjunction with FIG. 4, a third embodiment of the invention is shown. Referring now to FIG. 4, there is shown a typical mirror assembly 10, which is attached to a vehicle via a bracket 12. The mirror assembly 10 includes a mirror head 15 and a main mirror 16. A spotter mirror 26 is provided below the main mirror 16.

Spotter mirror 26 has a surface contour that is convex, which provides an extended field of view of the rear and side of the vehicle that is not possible with the main mirror 16 (which typically has a planar surface or a surface with less curvature than the spotter mirror).

To further increase the field of view that is provided by spotter mirror 26, and in accordance with the principles of the present invention, spotter mirror 26 is provided with an orientation adjustment mechanism (not shown) which can adjust the orientation of spotter mirror 26 with respect to the head 15. By adjustment of the orientation of spotter mirror 26, a full field of view about the side and rear of the vehicle may be provided to the driver. The orientation of the spotter mirror 26 may be adjusted about both horizontal and vertical axes.

The adjustment of the orientation of spotter mirror 26 may be controlled directly by the driver by operating one or more control switches within the cabin of the vehicle. Activation of these control switches will provide orientation signals to the adjusting mechanism, which could be for example, one or more small electric motors.

It is also possible for the driver to adjust the spotter mirror 26 into an ideal position for a given circumstance and save orientation parameters to an electronic memory device and associate these parameters with a given orientation identification. Upon activation of a control relating to this orientation identification, the preset parameters for that desired orientation are accessed from the memory and provided to a control system which adjusts the orientation of the spotter mirror 26 to the precise orientation parameters. It is possible for the driver to save multiple, different mirror orientations and associate different orientation identifications for each mirror orientation. Accordingly, it is possible for the driver to place the spotter mirror 26 in a particular desired orientation simply by pressing a single button.

In FIG. 6, there is shown a simplified system block diagram. The diagram shows mirror assembly 10 with spotter mirror 26 mounted to mirror head 15. The orientation of spotter mirror 26 is adjusted by electric motor 70. Control signals to control the operation of electric motor 70 are derived from control system 80 as would be understood by the person skilled in the art. The system allows the driver of the vehicle to directly adjust the orientation of spotter mirror 26 via control switch 90. Upon activation of control switch 90, appropriate signals are transmitted to control block 80 which then provides the required control signals to electric motor 70 to adjust spotter mirror 26 in accordance with the driver's input. It will be understood that control switch 90 can consist of any suitable mechanism including a small joystick or a series of orientation switches.

It is also possible for orientation parameters to be stored in memory device 100 and assigned with particular orientation identification. This orientation identification can be selected by one of a plurality of selection switches 101 to 105. For example, if the driver requires the spotter mirror 26 to be oriented such that it provides the best field of view of a region directly to the side of the vehicle, the driver may manually adjust this orientation via control switch 90. The driver may then record these orientation parameters in memory device 100 and assign that particular position to selection switch 101. The driver may then manually re-adjust the orientation of switch 26 via switch control 90 to change the position of spotter mirror 26 as desired. When the driver requires spotter mirror 26 to assume the desired position to provide the best field of view to the region directly to the side of the vehicle as previously discussed, the driver need not manually adjust the orientation of spotter mirror 26 via control switch 90, but may simply press selection switch 101 which will provide orientation parameter data stored in memory device 100 to control system 80 which then provides the appropriate control signals to electric motor 70 to place spotter mirror 26 in the desired position. Multiple different orientations may be saved in memory device 100 and allocated to other individual selection switches 102 to 105. Of course it will be understood that any number of mirror orientation parameters may be saved and provided with respective parameter identifications.

It is also possible to preprogram the orientation spotter mirror 26 such that it will automatically assume a given orientation upon a given state of the vehicle. For example, as soon as the vehicle is placed in reverse, spotter mirror 26 may be automatically oriented such as to provide a clear view of the rear of the vehicle. The activation signals for this may come directly from any suitable means such as sensing the position of the gear lever, or other gear train component, or sensing reverse motion of the wheels.

While the mirror assembly 10 shown in FIG. 4 has a telescopically adjustable head, the above-described third embodiment of the invention may equally be applied to a mirror not having a telescopically adjustable head.

International Application No. PCT/AU00/00413 titled "Method of producing a plastic moulded part including a film covering" discloses a method of forming a moulding component comprising an outer thin film component with an adhered moulded shell. The method of that disclosure could be used to mould hollow form components that may be used with this invention (for instance for the shell of the head and base) and the disclosure of this application is incorporated herewith in its entirety.

International Application No. PCT/AU02/01004 titled "Foldable vehicle external mirror having auxiliary mirror" discloses a vehicle external mirror having an auxiliary mirror mounted to a distal side of the mirror head. The auxiliary mirror provides rear vision when the mirror head is in its folded position. This features and other features disclosed in PCT/AU02/01004 are/could be used with the present invention and the disclosure of PCT/AU02/01004 is herewith incorporated in its entirety into this specification.

International Application No. PCT/AU02/00353 titled "External vehicle mirror having self-loading pivot and improved end stop" discloses a mirror assembly having a self-loading pivot mechanism wherein initial rotation of the mirror head with respect to the mirror base causes preloading of a spring. These features and other features disclosed could be used with the present invention and the disclosure of PCT/AU02/00353 is herewith incorporated in its entirety into this specification.

International Application No. PCT/AU02/00906 titled "Mirror Heater" discloses an automatic heating control system and apparatus for heating the surface of a mirror to de-ice or de-fog the mirror. The heating process is initiated upon starting the vehicle engine, and is conducted in accordance with an actual measured temperature of the mirror. These features and other features disclosed in this document could be used with the present invention and the disclosure of PCT/AU02/00906 is hereby incorporated in its entirety in to this current specification.

It would also be possible to incorporate other components with the mirror base (mounting bracket) and or mirror head. Such components include electronic sensors such as proximity sensors to determine if the vehicle mirror is close to an obstruction, sensors that sense external temperature and humidity, and sensors incorporated with the car security system such as motion detectors. Other various electronic equipment may be incorporated into the mirror base (mounting bracket) such as lights used to light the area around the vehicle, or lights that may be controlled from within the vehicle that enable the light to be moved so as to provide directional lighting. Speakers and microphones used to communicate to people external of the vehicle may also be incorporated as well as antennas for various apparatus such as mobile phones, GPS devices and other radio communication devices. In addition, transmitters may be incorporated into the mounting bracket which are used for controlling external objects such as garage doors or providing radio transmissions which may be used, for example, to track or locate the vehicle. Other electronic devices such as automatic toll payment systems or remote transaction systems may be incorporated into the mounting bracket to enable electronic registration of various toll payments.

Cameras may also be incorporated into the mirror base (mounting bracket) which are both forward and rearward looking which are designed to continuously record digital images and to store those images either on command or as a result of an accident or incident. Motion sensors including accelerometers can be used to determine the occurrence of an accident or incident so that images before and after the event are stored.

While the present invention has been described in terms of preferred embodiments in order to facilitate better understanding of the invention, it should be appreciated that various modifications can be made without departing from the principles of the invention. Therefore, the invention should be understood to include all such modifications within its scope.

The invention claimed is:

1. A power telescoping vehicle mirror assembly comprising:
    a bracket mountable to a vehicle;
    a mirror head telescopically mounted to the bracket;
    a mirror pivotally mounted to the head, said mirror head includes a spotter mirror and a main mirror, the spotter mirror having a wider field of view than the main mirror, and at least one of said mirrors is pivotally mounted to said mirror head;

a main mirror adjusting motor mechanism for adjusting the angular position of the main mirror with respect to the head;

a power telescope motor mechanism for telescopically moving the head with respect to the bracket between a retracted position and an extended position;

a switch operable by a driver of the vehicle, the switch providing a signal to actuate the power telescope motor mechanism;

a position sensor for sensing the telescopic position of the mirror head with respect to the bracket; and a compensating controller, the compensating controller controlling the angular position of the main mirror with respect to the head in response to the telescopic position of the head as sensed by the position sensor.

2. A power telescoping vehicle mirror assembly as claimed in claim 1 wherein the angle between the normal axis of the main mirror and the longitudinal axis of the vehicle increases as the mirror head extends away from the bracket.

3. A power telescoping vehicle mirror assembly as claimed in claim 2 wherein the increase is such that a continually acceptable field of view is presented to the driver without the need for manual adjustment of the angular position of the main mirror with respect to the head.

4. A vehicle external mirror assembly comprising:
a bracket mountable to a vehicle;
a mirror head mounted to the bracket;
a main mirror mounted to the head;
a spotter mirror mounted to the head, the spotter mirror having a wider field of view than the main mirror;
a spotter mirror motor mechanism for adjusting the orientation of the spotter mirror with respect to the head;
wherein when the vehicle is placed in a reversed gear, the orientation of the spotter mirror is automatically adjusted to assume an orientation that provides a different field of view for reversing;
a power telescope motor mechanism for telescopically moving the head with respect to the bracket;
a position controller for controlling the extent to which the mirror head extends with respect to the vehicle;
a switch operable by a driver of the vehicle, the switch providing a signal to the position controller; and
an input for providing the position controller with a set point;
wherein upon actuation of the switch, the head telescopically moves with respect to the bracket from a retracted position to a partially extended position determined by the set point;
a position sensor for sensing the telescopic position of the mirror head with respect to the bracket; and
a compensating controller, the compensating controller controlling the angular position of the main mirror with respect to the head in response to the telescopic position of the head as sensed by the position sensor.

5. A vehicle external mirror assembly as claimed in claim 4, wherein the angle between the normal axis of the main mirror and the longitudinal axis of the vehicle increases as the mirror head extends away from the bracket.

6. A vehicle external mirror assembly as claimed in claim 5 wherein the increase is such that a continually acceptable field of view is presented to the driver without the need for manual adjustment of the angular position of the main mirror with respect to the head.

7. A vehicle external mirror assembly comprising:
a bracket mountable to a vehicle;
a mirror head mounted to the bracket;
a main mirror mounted to the head;
a spotter mirror mounted to the head, the spotter mirror having a wider field of view than the main mirror;
a spotter mirror motor mechanism for adjusting the orientation of the spotter mirror with respect to the head;
a power telescope motor mechanism for telescopically moving the head with respect to the bracket;
a position controller for controlling the extent to which the mirror head extends with respect to the vehicle;
a switch operable by a driver of the vehicle, the switch providing a signal to the position controller; and
an input for providing the position controller with a set point,
wherein upon actuation of the switch, the head telescopically moves with respect to the bracket from a retracted position to a partially extended position determined by the set point;
a position sensor for sensing the telescopic position of the mirror head with respect to the bracket; and
a compensating controller, the compensating controller controlling the angular position of the main mirror with respect to the head in response to the telescopic position of the head as sensed by the position sensor.

8. A vehicle external mirror assembly as claimed in claim 7, wherein the angle between the normal axis of the main mirror and the longitudinal axis of the vehicle increases as the mirror head extends away from the bracket.

9. A vehicle external mirror assembly as claimed in claim 8 wherein the increase is such that a continually acceptable field of view is presented to the driver without the need for manual adjustment of the angular position of the main mirror with respect to the head.

* * * * *